US012731511B2

(12) United States Patent
Fu et al.

(10) Patent No.: US 12,731,511 B2
(45) Date of Patent: Sep. 8, 2026

(54) SPLICED DISPLAY PANEL AND DISPLAY DEVICE

(71) Applicants: BEIJING BOE DISPLAY TECHNOLOGY CO., LTD., Beijing (CN); BOE Technology Group Co., Ltd., Beijing (CN)

(72) Inventors: Changjia Fu, Beijing (CN); Zhuang Xu, Beijing (CN); Haijun Shi, Beijing (CN); Jixing Sun, Beijing (CN); Wei Zhong, Beijing (CN); Xiaodi Sun, Beijing (CN); Qingshan Qu, Beijing (CN); Bochang Wang, Beijing (CN); Fei Dong, Beijing (CN); Hongbo Feng, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 107 days.

(21) Appl. No.: 18/701,036

(22) PCT Filed: Jan. 3, 2023

(86) PCT No.: PCT/CN2023/070067
§ 371 (c)(1),
(2) Date: Apr. 12, 2024

(87) PCT Pub. No.: WO2023/131107
PCT Pub. Date: Jul. 13, 2023

(65) Prior Publication Data

US 2024/0346961 A1 Oct. 17, 2024

(30) Foreign Application Priority Data

Jan. 4, 2022 (CN) ........................ 202210002722.5

(51) Int. Cl.
*G09F 9/302* (2006.01)

(52) U.S. Cl.
CPC .................................. *G09F 9/3026* (2013.01)

(58) Field of Classification Search
CPC ........ G02B 6/0053; G02B 5/045; G02B 5/04; G02B 6/0036; G02B 27/283;
(Continued)

(56) References Cited

U.S. PATENT DOCUMENTS

2003/0231144 A1* 12/2003 Cho .................... G02F 1/13336 345/1.3
2009/0303416 A1* 12/2009 Jeong ................ G02F 1/133504 349/64
(Continued)

FOREIGN PATENT DOCUMENTS

CN 201402568 Y 2/2010
CN 103366643 A 10/2013
(Continued)

OTHER PUBLICATIONS

International Search Report and Written Opinion from PCT Application Serial No. PCT/CN2023/070067, dated Mar. 14, 2023, 19 pages.

*Primary Examiner* — Humam M Satti
(74) *Attorney, Agent, or Firm* — Kinney & Lange, P.A.

(57) ABSTRACT

Provided is a spliced display panel, including: a plurality of display panels, adjacent display panels in the plurality of display panels splice are spliced; a seam between at least two adjacent spliced display panels; and an optical assembly located on a light emitting side of the plurality of display panels, an orthographic projection of the optical assembly on the display panel covers an orthographic projection of the seam on the display panel. The optical assembly includes: a spacer portion and a prism portion provided on the spacer portion, the prism portion includes a plurality of prisms, and an orthographic projection of at least one prism in the
(Continued)

plurality of prisms on the display panel overlaps with the orthographic projection of the seam on the display panel.

19 Claims, 15 Drawing Sheets

(58) Field of Classification Search
CPC ......... G02B 27/0972; G09G 2300/026; G09G 2320/02; G09G 2300/02; G09G 2300/04; G09F 9/3026; G09F 9/3023; G09F 9/30; G09F 9/302; G06F 3/1446; H01L 25/0753; H01L 25/0655; G02F 1/13336; G02F 1/133388; G02F 1/1339; G02F 1/1335; G02F 1/13394; G02F 1/13398; G02F 1/0102; G02F 1/133; G02F 1/13
See application file for complete search history.

(56) References Cited

U.S. PATENT DOCUMENTS

| | | | | |
|---|---|---|---|---|
| 2010/0259566 | A1 | 10/2010 | Watanabe | |
| 2011/0128208 | A1* | 6/2011 | Choi | H01J 11/34 345/60 |
| 2013/0229798 | A1* | 9/2013 | Shimakawa | G02B 6/0068 362/235 |
| 2013/0235560 | A1* | 9/2013 | Etienne | G02B 27/1066 359/708 |
| 2015/0362638 | A1* | 12/2015 | Wang | G02B 5/04 359/831 |
| 2018/0275449 | A1* | 9/2018 | Wu | G02F 1/133512 |
| 2019/0004216 | A1* | 1/2019 | Jeong | H04M 1/0266 |

FOREIGN PATENT DOCUMENTS

| | | | |
|---|---|---|---|
| CN | 203631088 | U | 6/2014 |
| CN | 104062795 | A | 9/2014 |
| CN | 103700323 | B | 12/2015 |
| CN | 205845413 | U | 12/2016 |
| CN | 106297582 | A | 1/2017 |
| CN | 106814485 | A | 6/2017 |
| CN | 108766255 | A | 11/2018 |
| CN | 109036152 | A | 12/2018 |
| CN | 109377892 | A | 2/2019 |
| CN | 109410773 | A | 3/2019 |
| CN | 110456552 | A | 11/2019 |
| CN | 212460249 | U | 2/2021 |
| CN | 113327510 | A | 8/2021 |
| CN | 114333610 | A | 4/2022 |

* cited by examiner

Minimum tooth pitch 0.03 mm

Minimum tooth pitch 0.06 mm

Minimum tooth pitch 0.1 mm

Minimum tooth pitch 0.2 mm

Focal length 20 mm

Focal length 40 mm

Thickness 10 mm

Thickness 12 mm

Thickness 15 mm

SPLICED DISPLAY PANEL AND DISPLAY DEVICE

CROSS-REFERENCE TO RELATED APPLICATION(S)

This application is a Section 371 National Stage Application of International Application No. PCT/CN2023/070067, filed on Jan. 3, 2023, which claims priority to Chinese Patent Application No. 202210002722.5 filed on Jan. 4, 2022, the disclosure of which is incorporated herein by reference in its entirety.

TECHNICAL FIELD

The present disclosure relates to the field of display technology, and in particular to a spliced display panel and a display device.

BACKGROUND

With the rapid development of flat panel display technology, sizes and application scenarios of flat panels are constantly expanding. Due to limited sizes of various display units, an ultra-large display achieved by splicing various display units has been applied in various aspects of life, such as outdoor advertising, sports venues, command halls, shopping malls and other application scenarios. In a spliced display device, a non-display region, that is, a seam, generally exists in a splicing region between adjacent display units, which may affect a display effect of the spliced display device.

SUMMARY

In order to solve at least one aspect of the above-mentioned problems, the present disclosure provides a spliced display panel and a display device.

In an aspect, a spliced display panel is provided, including: a plurality of display panels, adjacent display panels in the plurality of display panels are spliced; a seam between at least two adjacent spliced display panels; and an optical assembly located on a light emitting side of the plurality of display panels, an orthographic projection of the optical assembly on the display panel covers an orthographic projection of the seam on the display panel, the optical assembly includes: a spacer portion; and a prism portion provided on the spacer portion, the prism portion includes a plurality of prisms, and an orthographic projection of at least one prism in the plurality of prisms on the display panel overlaps with the orthographic projection of the seam on the display panel.

According to some exemplary embodiment, the spacer portion includes an accommodating groove on a side of the spacer portion away from the display panel; and the prism portion is provided in the accommodating groove.

According to some exemplary embodiment, a surface of the spacer portion away from the display panel is a flat surface, and the prism portion is provided on the flat surface.

According to some exemplary embodiment, the spacer portion includes a recessed portion on a side of the spacer portion away from the display panel; and the prism portion is provided in the recessed portion.

According to some exemplary embodiment, the spliced display panel further includes a fixing bracket located in the seam, and the fixing bracket is configured to fixedly connect the optical assembly with the display panel; the fixing bracket includes a first fixing portion connected to the optical assembly and a second fixing portion connected to the display panel; and the spacer portion includes an installation groove, and the first fixing portion is located in the installation groove.

According to some exemplary embodiment, the prism portion includes a body portion, the body portion includes a first embedding portion, a middle portion and a second embedding portion, the first embedding portion and the second embedding portion are located on two opposite sides of the middle portion, and the plurality of prisms are arranged on a side of the middle portion away from the display panel; and the middle portion protrudes relative to the first embedding portion and the second embedding portion in a light emitting direction of the display panel.

According to some exemplary embodiment, the spacer portion includes a first groove and a second groove located on two opposite sides of the accommodating groove, the first embedding portion is embedded in the first groove, and the second embedding portion is embedded in the second groove.

According to some exemplary embodiment, the prism portion has a symmetrical structure with respect to a first axis, the first axis is parallel to the light emitting direction of the display panel, and the first axis is located at a middle position of the seam in a width direction of the seam; and the plurality of prisms include a first group of prisms and a second group of prisms, and the first group of prisms and the second group of prisms are symmetrical with respect to the first axis.

According to some exemplary embodiment, the plurality of prisms have a zigzag structure embedded in the middle portion, parameters of each of the plurality of prisms include a tooth depth and a tooth angle, each prism has a first vertex away from the spacer portion and a second vertex close to the spacer portion, the tooth depth is a size between the first vertex and the second vertex in the light emitting direction, and the tooth angle is a vertex angle of the prism at the first vertex; and each of the first group of prisms and the second group of prisms includes a first prism closest to the first axis and a second prism farthest away from the first axis, and the tooth angles of the prisms gradually increase in a direction from the first prism to the second prism.

According to some exemplary embodiment, the tooth depths of the plurality of prisms are equal to each other.

According to some exemplary embodiment, a distance between two adjacent prisms in each of the first group of prisms and the second group of prisms is a tooth pitch; and the tooth pitches in each of the first group of prisms and the second group of prisms gradually increase in the direction from the first prism to the second prism.

According to some exemplary embodiment, the tooth depths of the plurality of prisms gradually increase in the direction from the first prism to the second prism; and/or a distance between two adjacent prisms in each of the first group of prisms and the second group of prisms is a tooth pitch, and the tooth pitches in each of the first group of prisms and the second group of prisms remain unchanged in the direction from the first prism to the second prism.

According to some exemplary embodiment, the spacer portion includes an inclined wall on a side of the spacer portion close to the seam, and an orthographic projection of at least part of the inclined wall on the display panel overlaps with the orthographic projection of the seam on the display panel; and the inclined wall has a slope angle with respect to a light emitting surface of the display panel, and the slope angle is greater than or equal to 45°.

According to some exemplary embodiment, a surface of the inclined wall is configured to totally reflect light emitted from the display panel and incident onto the surface of the inclined wall.

According to some exemplary embodiment, the first fixing portion of the fixing bracket includes a slope surface, a slope of the slope surface is equal to a slope of the inclined wall, and the slope surface is bonded on the inclined wall.

According to some exemplary embodiment, a surface of the inclined wall is a polished surface and/or is provided with a total reflection coating; and/or the slope surface is a polished surface.

According to some exemplary embodiment, the inclined walls of two adjacent spacer portions are abutted against each other and are formed as groove walls of the installation groove; and orthographic projections of abutting portions of the inclined walls of two adjacent spacer portions on the display panel fall within the orthographic projection of the seam on the display panel.

According to some exemplary embodiment, the fixing bracket includes a first bracket and a second bracket, the first bracket is connected to one of two adjacent spliced display panels, and the second the bracket is connected to the other of the two adjacent spliced display panels; and each of the first bracket and the second bracket includes a first fixing portion, the first fixing portion of each of the first bracket and the second bracket includes a slope surface, and a combination of the first fixing portion of the first bracket and the first fixing portion of the second bracket has a substantially triangular cross-section.

According to some exemplary embodiment, each of the first bracket and the second bracket includes a second fixing portion, and the second fixing portion of each of the first bracket and the second bracket includes a threaded hole; and the display panel includes a front frame, and the second fixing portion of each of the first bracket and the second bracket is connected to the front frame of the display panel through a screw inserted into the threaded hole.

According to some exemplary embodiment, the first vertex of the prism does not exceed a surface of the spacer portion away from the display panel in the light emitting direction.

According to some exemplary embodiment, the surface of the spacer portion away from the display panel exceeds the first vertex of the prism by 0.05~0.1 mm in the light emitting direction.

According to some exemplary embodiment, the tooth depth of each prism ranges from 0.05 mm to 0.5 mm; and/or the tooth pitch between any two adjacent prisms ranges from 0.05 mm to 1 mm; and/or the tooth angle of each prism ranges from 40° to 70°; and/or a focal length of the prism portion ranges from 10 mm to 50 mm.

According to some exemplary embodiment, a thickness of the spacer portion ranges from 5 mm to 15 mm.

According to some exemplary embodiment, the spacer portion and the prism portion are formed as an integral structure.

According to some exemplary embodiment, a material of the spacer portion and/or the prism portion includes polymethyl methacrylate, polycarbonate, polyethylene terephthalate or glass, and/or a material of the fixing bracket includes a metal.

In another aspect, a display device is provided, including the spliced display panel described above.

BRIEF DESCRIPTION OF THE DRAWINGS

Through the following descriptions of the present disclosure with reference to the accompanying drawings, other objectives and advantages of the present disclosure may be obvious and the present disclosure may be understood comprehensively.

Figure 1:
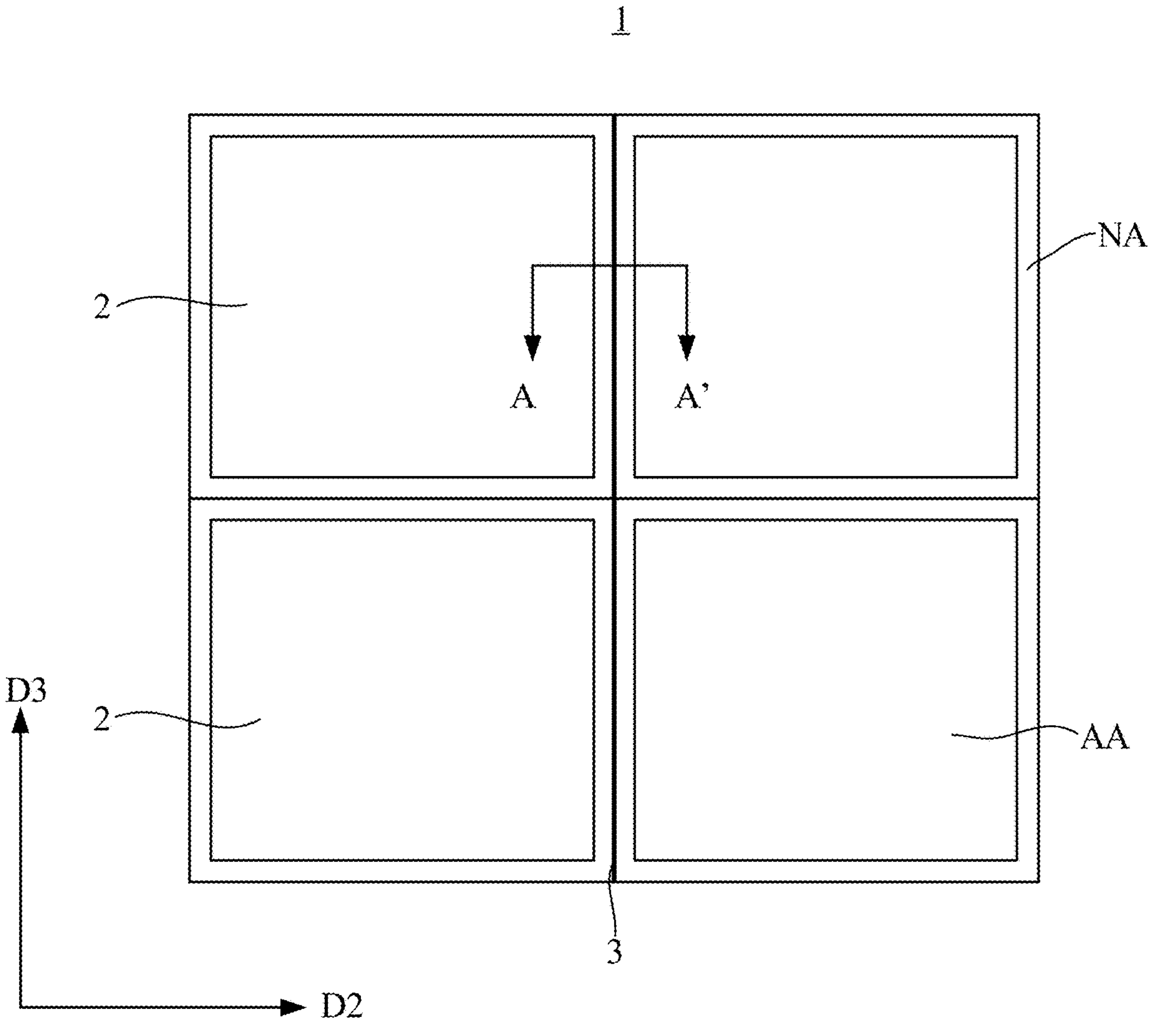
FIG. 1 is a schematic plan view of a spliced display panel according to the embodiments of the present disclosure.

It should be noted that for the sake of clarity, sizes of layers, structures or regions may be enlarged or reduced in the accompanying drawings used to describe the embodiments of the present disclosure, that is, those drawings are not drawn according to actual scale.

DETAILED DESCRIPTION OF EMBODIMENTS

Technical solutions of the present disclosure will be further described in detail below through the embodiments with reference to the accompanying drawings. In the specification, the same or similar reference numerals represent the same or similar components. The following descriptions of the embodiments of the present disclosure with reference to the accompanying drawings are intended to explain a general inventive concept of the present disclosure and should not be understood as a limitation to the present disclosure.

In addition, in the following detailed descriptions, for convenience of explanation, many specific details are set forth to provide a comprehensive understanding of the embodiments of the present disclosure. However, it is obvious that one or more embodiments may also be implemented without the specific details.

It should be noted that although terms “first”, “second”, and so on may be used here to describe various components, members, elements, regions, layers and/or parts, these components, members, elements, regions, layers and/or parts should not be limited by these terms. Rather, these terms are used to distinguish one component, member, element, region, layer and/or part from another. Thus, for example, a first component, a first member, a first element, a first region, a first layer and/or a first part discussed below may be referred to as a second component, a second member, a second element, a second region, a second layer and/or a second part without departing from teachings of the present disclosure.

Unless otherwise specified, the expression “abutted against” used herein indicates a connection relationship between two members or components. In such connection relationship, adjacent surfaces of two members or components are abutted and in contact with each other.

According to the embodiments of the present disclosure, a spliced display panel is provided, including: a plurality of display panels, adjacent display panels in the plurality of display panels are spliced; a seam between at least two adjacent spliced display panels; and an optical assembly on a light emitting side of the plurality of display panels, an orthographic projection of the optical assembly on the display panel covers an orthographic projection of the seam on the display panel. The optical assembly includes: a spacer portion including an accommodating groove on a side of the spacer portion away from the display panel; and a prism portion provided in the accommodating groove. The prism portion includes a plurality of prisms, and an orthographic projection of at least one prism in the plurality of prisms on the display panel overlaps with the orthographic projection of the seam on the display panel. In the embodiments of the present disclosure, by providing the optical assembly above a display module, light in an edge display region of the display module may be refracted to the seam through the optical assembly, so that the light may cover an entire seam, and a seamless visual effect may be achieved.

FIG. 1 is a schematic plan view of a spliced display panel according to the embodiments of the present disclosure. As shown in FIG. 1, a spliced display panel formed by splicing four display panels with frames is illustrated by way of example in describing the embodiments of the present disclosure. It should be noted that the four display panels in FIG. 1 are just schematic and should not be construed as limiting the embodiments of the present disclosure.

It should be noted that herein, a liquid crystal display panel (i.e., LCD display panel) is illustrated as an example of the display panel for splicing in describing the embodiments of the present disclosure. However, the embodiments of the present disclosures are not limited to this. For example, in other embodiments, the display panel for splicing may include but not be limited to an OLED display panel (i.e., organic light emitting diode display panel), a Mini LED display panel (Mini light emitting diode display panel), etc.

As shown in FIG. 1, a spliced display panel 1 may include a plurality of display panels 2, and at least one display panel 2 may include a display region AA and a frame region NA. For example, taking a liquid crystal display panel as an example, in the frame region NA, a black matrix and a sealant need to be provided at an edge. When two display panels 2 are spliced together, the frame regions NA of the two display panels 2 may be connected to each other to form a seam, as shown in region 3 in FIG. 1. In the related art, during a picture display, a non-display region is formed at the seam 3, which is visually presented as an obvious black border or black seam, and may affect an overall visual experience of the spliced display panel.

Figure 2:
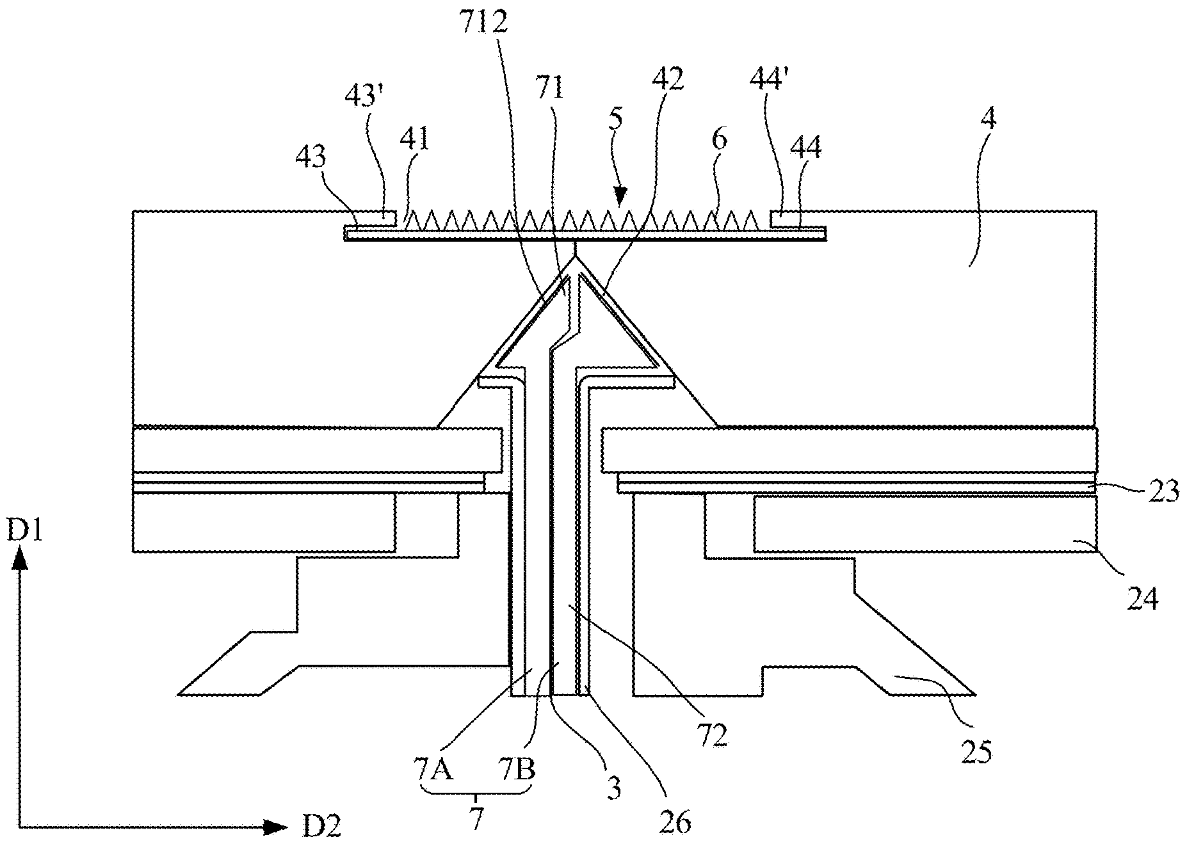
FIG. 2 is a schematic cross-sectional view of the spliced display panel according to the embodiments of the present disclosure taken along line AA' in FIG. 1.

FIG. 2 is a schematic cross-sectional view of the spliced display panel according to the embodiments of the present disclosure taken along line AA' in FIG. 1.

Referring to FIG. 1 and FIG. 2 in combination, the spliced display panel 1 may include: the plurality of display panels 2, adjacent display panels in the plurality of display panels are spliced; the seam 3 between at least two adjacent spliced display panels 2; and the optical assembly on the light emitting side of the plurality of display panels, the orthographic projection of the optical assembly on the display panel covers the orthographic projection of the seam 3 on the display panel. In the embodiments of the present disclosure, the optical assembly may include: a spacer portion 4, the spacer portion 4 includes an accommodating groove 41 on a side of the spacer portion away from the display panel; and a prism portion 5 provided in the accommodating groove 41, the prism portion 5 includes a plurality of prisms 6, and an orthographic projection of at least one prism in the plurality of prisms on the display panel overlaps with the orthographic projection of the seam 3 on the display panel.

Herein, for convenience of description, three directions D1, D2 and D3 are established. For example, the direction D1 may represent a light emitting direction of the display panel, the direction D2 may represent a width direction of the seam, and the direction D3 may represent a length direction of the seam. Optionally, the directions D1, D2 and D3 may intersect with each other, such as perpendicular to each other. It should be understood that these directions are just for convenience of describing the embodiments of the present disclosure, and are not intended to limit the embodiments of the present disclosure.

Figure 3:
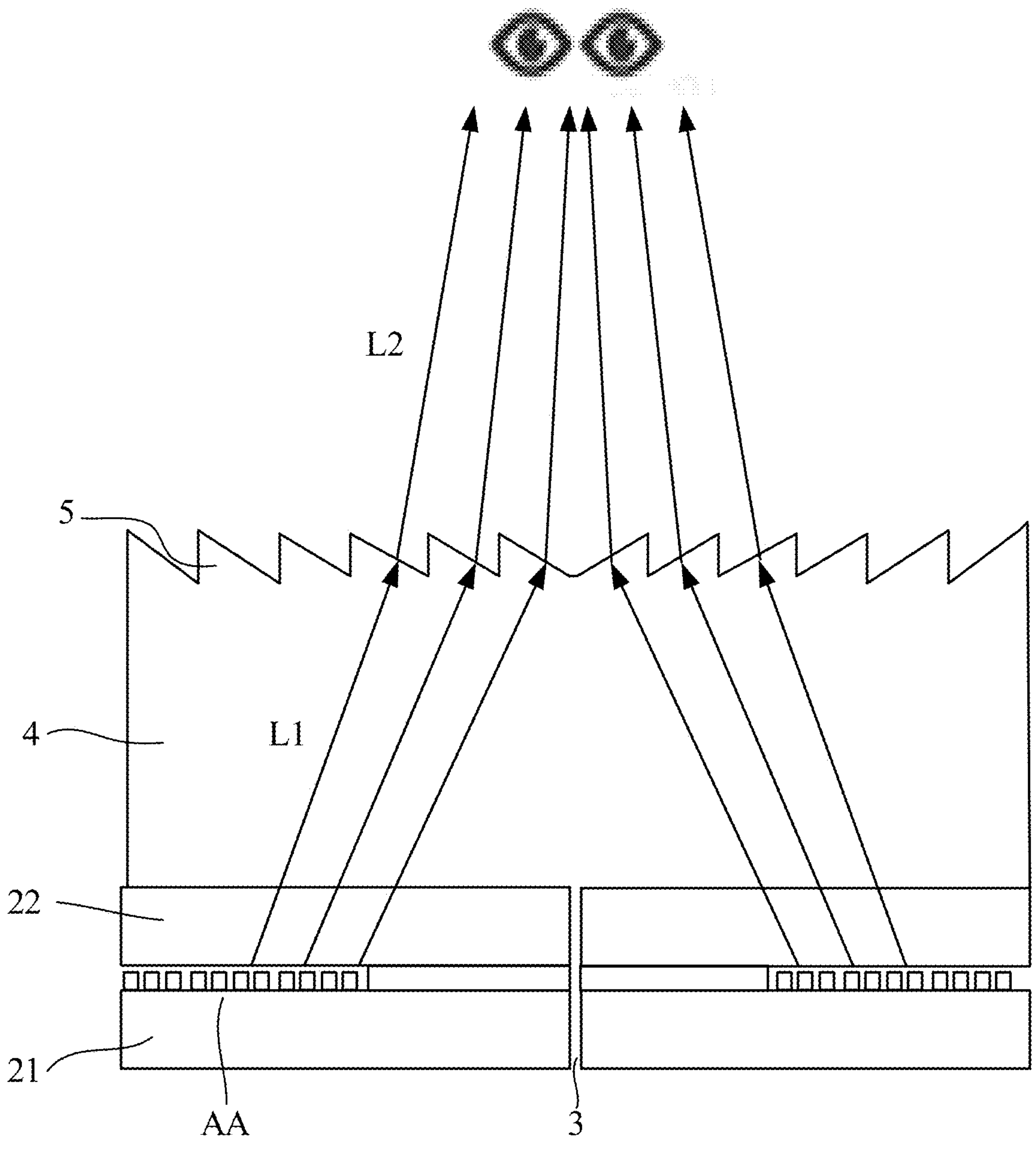
FIG. 3 is a principle diagram of an optical path of a spliced display panel according to the embodiments of the present disclosure, in which an optical path used to eliminate a seam is schematically shown.

FIG. 3 is a principle diagram of an optical path of a spliced display panel according to the embodiments of the present disclosure, in which an optical path used to eliminate a seam is schematically shown.

Referring to FIG. 1 to FIG. 3 in combination, the display panel 2 may be a liquid crystal display panel. For example, the display panel 2 may include an array substrate 21 and a color filter substrate 22 that are arranged opposite to each other. At a position close to the seam 3, light L1 emitted from the display region AA of the display panel 2 is incident onto the optical assembly. Under an action of the optical assembly, especially an action of the prism portion 5, the light L1 is refracted, and the light refracted by the prism portion 5 is shown as light L2 in FIG. 3. That is, under the action of the optical assembly, the light emitted from an edge display region of the display panel 2 moves toward the seam 3, and the emitted light L2 may cover the seam 3 between adjacent display panels 2, so that the seam 3 may be covered partially or completely. In this way, an influence of the seam 3 on a displayed image is reduced or eliminated, and an overall display effect of the spliced display panel is improved. In addition, in the embodiments of the present disclosure, by designing a structure of the optical assembly, the optical assembly is directly assembled with the display module, which is beneficial to ensure an assembly accuracy of the optical assembly and the display module, thereby improving the overall display effect of the spliced display panel.

Continuing to refer to FIG. 2, the spliced display panel 1 may further include a fixing bracket 7 located in the seam 3 and is used to fixedly connect the optical assembly with the display panel 2.

In the embodiments of the present disclosure, the fixing bracket 7 may include a first fixing portion 71 connected to the optical assembly and a second fixing portion 72 connected to the display panel. The spacer portion 4 includes an installation groove 42, and the first fixing portion 71 is located in the installation groove 42.

For example, the display panel 2 may include a liquid crystal screen, an optical membrane material 23, a diffusion plate 24, a middle frame 25, a front frame 26, and other components. For example, the liquid crystal screen may include a display module formed by aligning the array substrate 21 and the color filter substrate 22 mentioned above. The optical membrane material 23 may function to enhance brightness and increase screen shielding. The diffusion plate 24 may function to increase screen shielding and support the membrane material. The middle frame 25 may function to support the diffusion plate and the liquid crystal screen. The front frame 26 may function to fix the liquid crystal screen. A design of ultra-narrow frame module may be adopted for the display panel 2. For example, a width of the seam between two spliced display panels may range from 1 mm to 5 mm.

Figure 4:
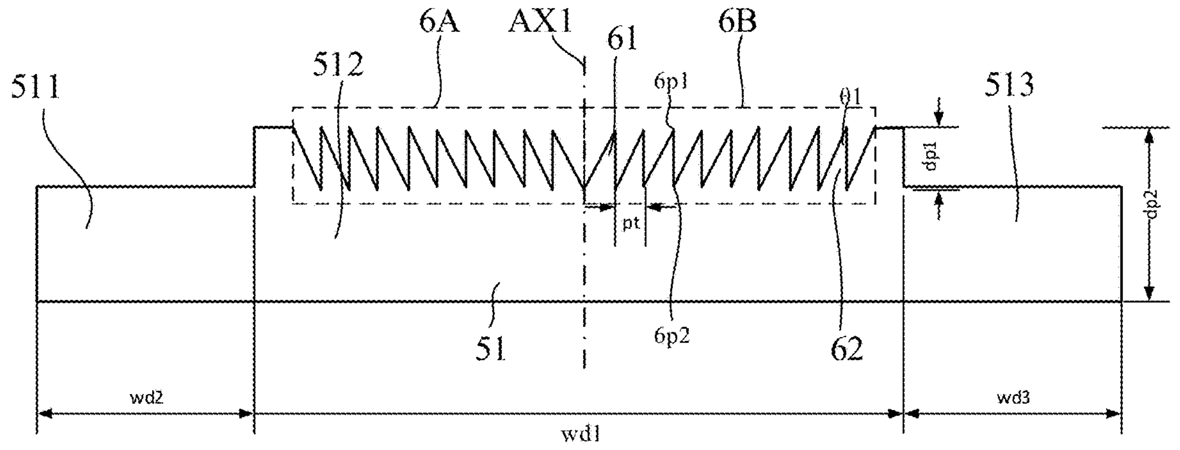
FIG. 4 is a schematic structural diagram of a prism portion of a spliced display panel according to the embodiments of the present disclosure.

FIG. 4 is a schematic structural diagram of the prism portion of the spliced display panel according to the embodiments of the present disclosure.

Referring to FIG. 2 and FIG. 4 in combination, the prism portion 5 includes a body portion 51, and the body portion 51 includes a first embedding portion 511, a middle portion 512 and a second embedding portion 513. The first embedding portion 511 and the second embedding portion 513 are located on two opposite sides of the middle portion 512. The plurality of prisms 6 are arranged on a side of the middle portion 512 away from the display panel. The middle portion 512 protrudes relative to the first embedding portion 511 and the second embedding portion 513 in the light emitting direction D1 of the display panel.

For example, the prism portion 5 has a symmetrical structure with respect to a first axis AX1. The first axis AX1 is parallel to the light emitting direction D1 of the display panel and is located at a middle position of the seam 3 in the width direction D2 of the seam 3.

For example, the plurality of prisms 6 include a first group of prisms 6A and a second group of prisms 6B, and the first group of prisms 6A and the second group of prisms 6B are symmetrical with respect to the first axis AX1.

Referring to FIG. 4, the plurality of prisms 6 have a zigzag structure embedded in the middle portion 512, and parameters of each prism 6 in the plurality of prisms include a tooth depth dp1 and a tooth angle θ1. For example, each prism 6 has a first vertex 6*p*1 away from the spacer portion and a second vertex 6*p*2 close to the spacer portion. The tooth depth dp1 is a size between the first vertex 6*p*1 and the second vertex 6*p*2 in the light emitting direction D1. The tooth angle θ1 is a vertex angle of the prism 6 at the first vertex 6*p*1.

For example, each of the first group of prisms 6A and the second group of prisms 6B includes a first prism 61 closest to the first axis AX1 and a second prism 62 farthest away from the first axis AX1. The tooth angles θ1 of the various prisms gradually increase in a direction from the first prism 61 to the second prism 62, that is, the tooth angles θ1 of the prisms gradually increase from the middle to the two sides.

In the embodiments of the present disclosure, the tooth angle of the prism ranges from 40° to 70°, so that the prism portion may achieve a good effect of eliminating the seam.

For example, in the embodiments shown in FIG. 4, for the first group of prisms 6A, the direction from the first prism 61 to the second prism 62 is from right to left; and for the second group of prisms 6B, the direction from the first prism 61 to the second prism 62 is from left to right.

For example, the tooth depths dp1 of various prisms in the plurality of prisms 6 may be equal to each other.

For example, in each of the first group of prisms and the second group of prisms, a distance between two adjacent prisms is a tooth pitch pt. In each of the first group of prisms and the second group of prisms, the tooth pitches pt gradually increase in the direction from the first prism 61 to the second prism 62, that is, the tooth pitches gradually increase from the middle to the two sides.

In other words, in the embodiments of the present disclosure, the tooth depths of the plurality of prisms may remain unchanged, and the tooth pitches may gradually increase from the middle to the two sides. That is, a design with equal tooth depths and different tooth pitches is adopted. By providing the prism portion designed with such structure, the light emitted from the edge display region may converge toward the seam in the middle, so that the seamless display effect may be achieved. In addition, such design may facilitate a manufacturing process of the prism portion and reduce a manufacturing difficulty of forming a plurality of prisms on the body portion.

Optionally, in the embodiments of the present disclosure, the tooth depths dp1 of the plurality of prisms 6 may gradually increase in the direction from the first prism 61 to the second prism 62. In each of the first group of prisms and the second group of prisms, the tooth pitches pt remain unchanged in the direction from the first prism 61 to the second prism 62. That is, in the embodiments of the present disclosure, a design with equal tooth pitches and different tooth depths may be adopted. By providing the prism portion designed with such structure, the light emitted from the edge display region may converge toward the seam in the middle, so that the seamless display effect may be achieved.

For example, in the embodiments of the present disclosure, the prism portion 5 may be made of a transparent material, including but not limited to polymethyl methacrylate (PMMA), polycarbonate (PC), polyethylene terephthalate (PET), or glass. In the embodiments of the present disclosure, a plurality of microstructures may be made on the body portion by laser engraving or mold hot pressing, so as to form the plurality of prisms 6.

Continuing to refer to FIG. 4, the body portion 51 includes the first embedding portion 511, the middle portion 512 and the second embedding portion 513. The middle portion 512 has a width wd1 in the direction D2, the first embedding portion 511 has a width wd2 in the direction D2, and the second embedding portion 513 has a width wd3 in the direction D2. For example, the width wd1 of the middle portion 512 is proportional to the width of the seam 3. The greater the width of the seam 3, the greater the width wd1 of the middle portion 512, and accordingly, the greater the width of the optical microstructure formed by the plurality of prisms 6 is. For example, the width wd1 of the middle portion 512 may range from 5 mm to 50 mm.

The first embedding portion 511 and the second embedding portion 513 may be embedded in the groove of the spacer portion, so that the prism portion is connected to the spacer portion. For example, the width wd2 of the first embedding portion 511 may be substantially equal to the width wd3 of the second embedding portion 513, and each of the width wd2 of the first embedding portion 511 and the width wd3 of the second embedding portion 513 may range from 5 mm to 15 mm.

As mentioned above, in the embodiments of the present disclosure, the body portion may be a thin film substrate, and a plurality of microstructures may be made on the body portion by laser engraving or mold hot pressing, so as to form the plurality of prisms 6. A maximum thickness of the thin film substrate, that is, a thickness dp2 of the middle portion in the direction D2, may range from 0.1 mm to 1.0 mm.

In the embodiments of the present disclosure, it is possible to establish models of the optical assembly with different design parameters in a simulation software, and an optimal parameter design may be determined with reference to a simulation result. For example, the seam of the spliced display panel may be about 4 mm, a thickness of the spacer portion of the optical assembly may be about 10 mm, and the thickness dp2 of the middle portion in the direction D1 may be about 0.3 mm. Under such conditions, different tooth depths, tooth pitches, focal lengths and other design parameters are respectively provided to perform a design optimization and an effect comparison.

Figure 10A:
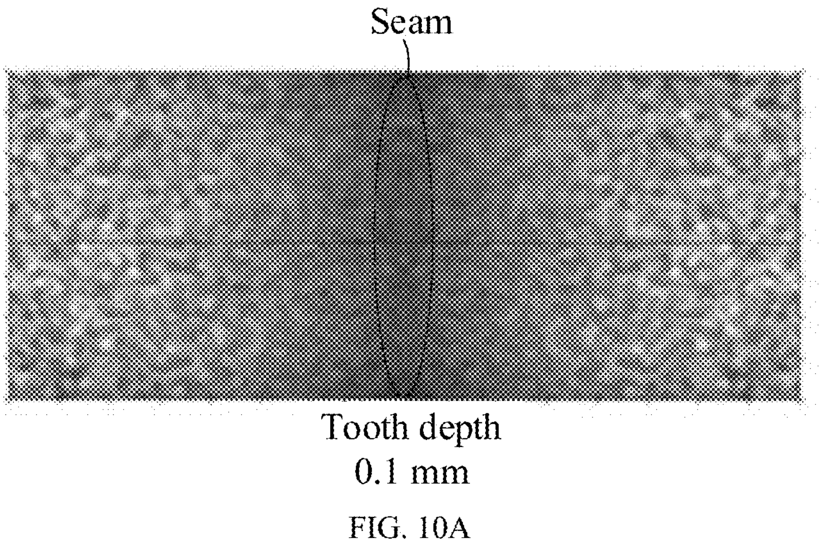
FIG. 10A to FIG. 10C are simulation effect diagrams of a spliced display panel with different tooth depth designs according to the embodiments of the present disclosure, respectively.
Figure 10B:
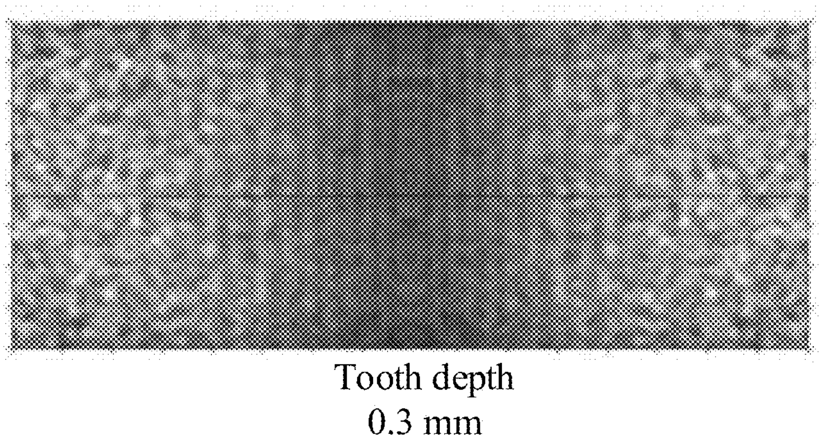
Figure 10C:
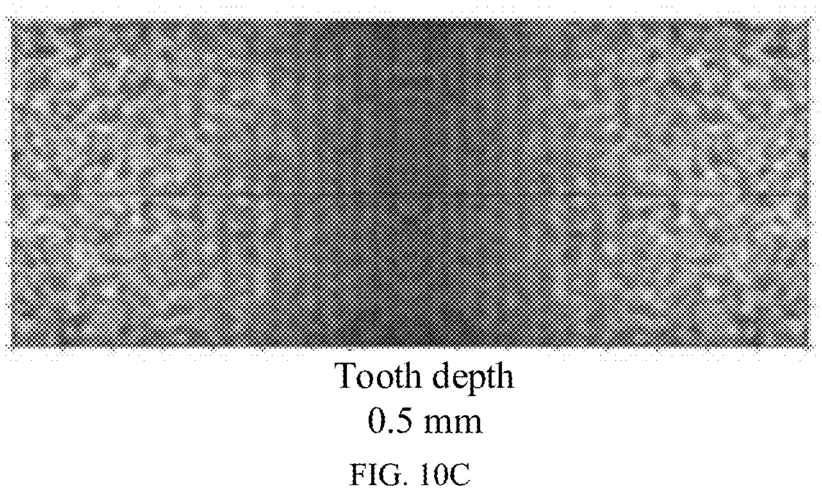
Figure 11A:
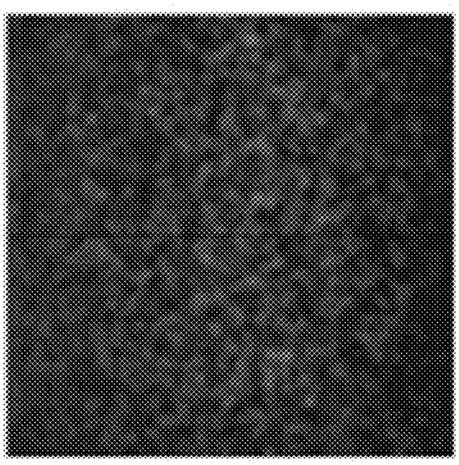
FIG. 11A to FIG. 11D are simulation effect diagrams of a spliced display panel with different tooth pitch designs according to the embodiments of the present disclosure, respectively.
Figure 11B:
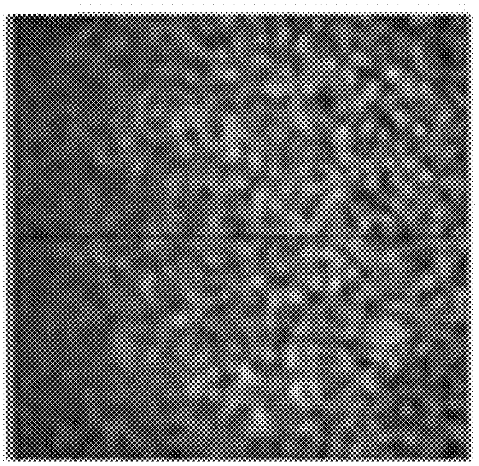
Figure 11C:
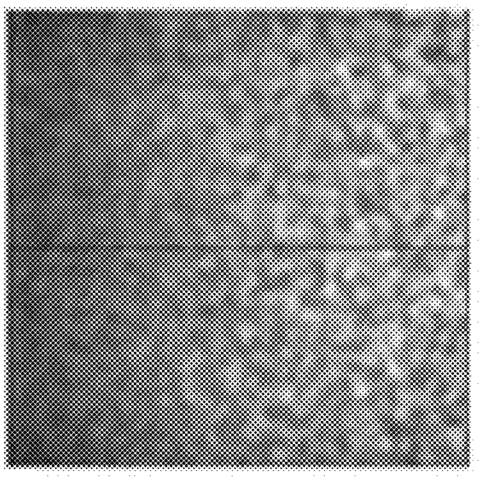
Figure 11D:
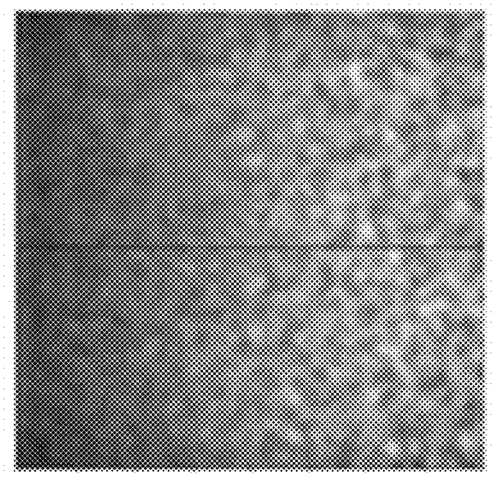
Figure 12A:
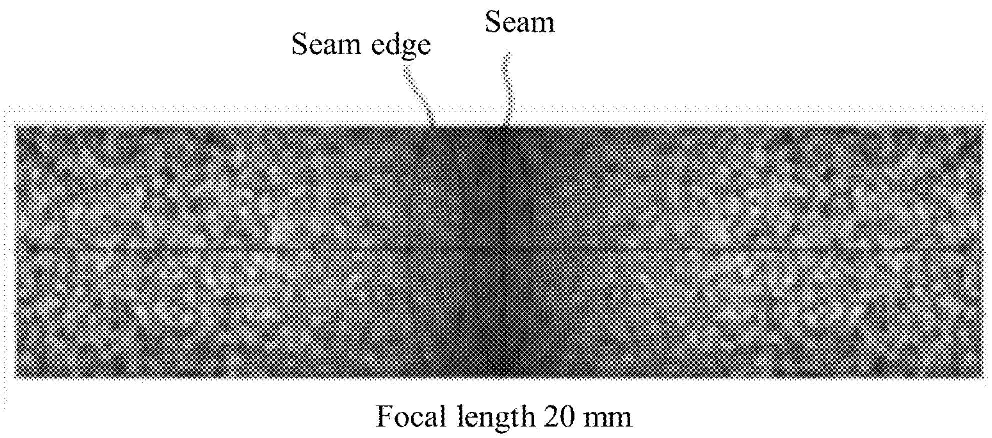
FIG. 12A to FIG. 12B are simulation effect diagrams of a spliced display panel with different focal length designs according to the embodiments of the present disclosure, respectively.
Figure 12B:
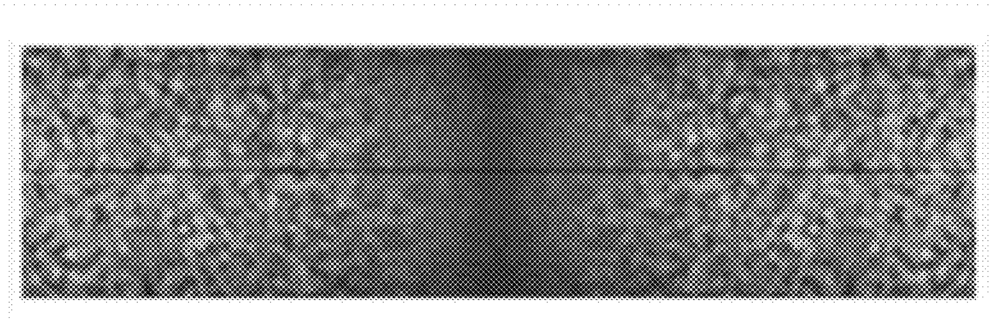

FIG. 10A to FIG. 10C are simulation effect diagrams of the spliced display panel with different tooth depth designs according to the embodiments of the present disclosure, respectively. FIG. 11A to FIG. 11D are simulation effect diagrams of the spliced display panel with different tooth pitch designs according to the embodiments of the present disclosure, respectively. FIG. 12A to FIG. 12B are simulation effect diagrams of the spliced display panel with different focal length designs according to the embodiments of the present disclosure, respectively.

Referring to FIG. 10A to FIG. 10C, the simulation results for tooth depth design values ranging from 0.1 mm to 0.5 mm are schematically shown when a minimum tooth pitch is set to 0.1 mm. For example, in FIG. 10A, the tooth depth is 0.1 mm; in FIG. 10B, the tooth depth is 0.3 mm; and in FIG. 10C, the tooth depth is 0.5 mm.

As shown in FIG. 10A to FIG. 10C, sawtooth of a picture gradually becomes apparent as the tooth depth increases. The inventors found through researches that the greater the tooth depth, the more obvious a protrusion of the prism, and the easier it is to cause a scratch of tooth structure and other problems during assembly and application; the less the tooth depth, the less obvious the sawtooth of the prism, the more delicate a picture transition, and the better the seamless effect, but a difficulty of processing and forming the prism may increase, and a processing apparatus is required to have a higher precision. In the embodiments of the present disclosure, the tooth depth may be set to 0.05~0.5 mm in comprehensive consideration of the picture effect and the difficulty of processing and forming.

In the embodiments of the present disclosure, in each of the first group of prisms and the second group of prisms, the tooth pitches pt gradually increase in the direction from the first prism 61 to the second prism 62, that is, the tooth pitches gradually increase from the middle to the two sides. Referring to FIG. 11A to FIG. 11D, the simulation results for a minimum tooth pitch ranging from 0.03 mm to 0.2 mm are schematically shown when the tooth depth is 0.1 mm. It should be noted that herein, the expression "minimum tooth pitch" refers to the tooth pitch between the first prism 61 and an adjacent prism.

As shown in FIG. 11A to FIG. 11D, with an increase of the tooth pitch, the overall brightness of the picture gradually increases, but the seamless effect at the edge gradually deteriorates, that is, a light-dark contrast between a seam position and a non-seam position gradually increases. In the embodiments of the present disclosure, the minimum tooth pitch may be set to 0.05~1 mm in comprehensive consideration of the overall picture brightness and the seam improvement effect. In other words, in the embodiments of the present disclosure, the minimum tooth pitch may be set to be 0.5~2 times the tooth depth.

Referring to FIG. 12A to FIG. 12B, the simulation results for focal length of 20 mm and focal length of 40 mm are shown when the tooth depth is 0.1 mm and the minimum tooth pitch is 0.1 mm. As shown in FIG. 12A and FIG. 12B, at the seam, the light-dark contrast and the picture transition effect when the focal length of the prism portion is 20 mm are slightly worse than the light-dark contrast and the picture transition effect when the focal length of the prism portion is 40 mm. At a seam edge position, when the focal length of the prism portion is 20 mm, a brightness of the seam edge position is higher and is close to the brightness of the overall picture, and the transition effect is better. In addition, from a design perspective, the greater the focal length of the prism portion, the more teeth provided in one and same length, and the greater the corresponding seam width. In the embodiments of the present disclosure, the focal length may be set to 10~50 mm in comprehensive consideration of the picture transition effect at the seam, the picture transition effect at the seam edge position, and the seam width.

Figure 5:
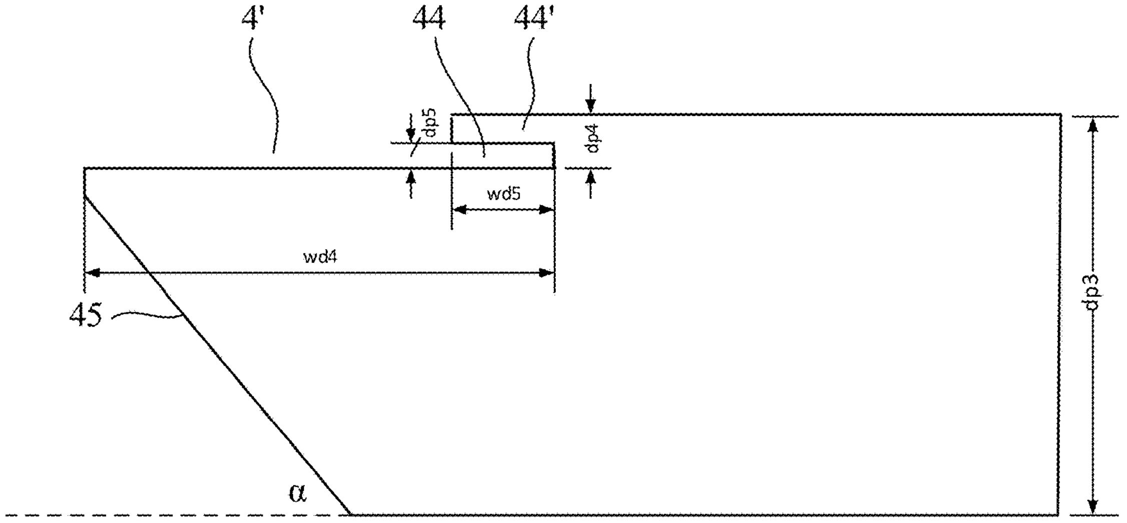
FIG. 5 is a schematic structural diagram of a spacer portion of a spliced display panel according to the embodiments of the present disclosure.

FIG. 5 is a schematic structural diagram of the spacer portion of the spliced display panel according to the embodiments of the present disclosure.

Referring to FIG. 2 and FIG. 5 in combination, the spacer portion 4 includes a first groove 43 and a second groove 44 that are located on two opposite sides of the accommodating groove 41. The first embedding portion 511 is embedded in the first groove 41, and the second embedding portion 513 is embedded in the second groove 44. In the embodiments of the present disclosure, through a cooperation of the embedding portions and the grooves, it is convenient to insert the prism portion into the grooves of the spacer portion to fix the prism portion and the spacer portion. The prism portion may slide in through the groove, which facilitates an installation and a replacement of the prism portion.

The spacer portion 4 includes an inclined wall 45 located on a side of the spacer portion close to the seam. An orthographic projection of at least part of the inclined wall 45 on the display panel overlaps with the orthographic projection of the seam 3 on the display panel. For example, the inclined wall 45 has a slope angle α with respect to a light emitting surface of the display panel, and the slope angle α is greater than or equal to 45°.

In the embodiments of the present disclosure, a surface of the inclined wall 45 is configured to totally reflect light emitted from the display panel and incident onto the surface of the inclined wall 45. For example, the surface of the inclined wall 45 is a polished surface and/or is provided with a total reflection coating.

For example, the inclined walls 45 of two adjacent spacer portions are abutted against each other, and are formed as groove walls of the installation groove 42. Orthographic projections of abutting portions of the inclined walls 45 of two adjacent spacer portions on the display panel fall within the orthographic projection of the seam 3 on the display panel.

For example, in the embodiments of the present disclosure, the spacer portion 4 may be made of a transparent material, including but not limited to polymethyl methacrylate (PMMA), polycarbonate (PC), polyethylene terephthalate (PET), or glass. For example, the spacer portion 4 may be formed by injection molding, grinding and polishing, and other methods. PC, PMMA and other materials are lightweight, but have a large amount of deformation in a case of high temperature or moisture absorption, which are suitable for indoor or semi-outdoor use. Glass material has a large weight, but has a high dimensional accuracy and a small amount of deformation in high temperature and high humidity environments, which is suitable for outdoor use.

Continuing to refer to FIG. 2 and FIG. 4, each spacer portion 4 is provided with a part of the accommodating groove on two opposite sides in the direction D2 respectively, which may be referred to as a receiving sub-groove 4'. When two spacer portions 4 are spliced together, the receiving sub-grooves 4' of two adjacent spacer portions 4 form a complete accommodating groove 4.

Corresponding to the first groove 43 and the second groove 44, the spacer portion 4 includes a first protruding arm 43' and a second protruding arm 44' on two opposite sides in the direction D2. In the embodiments of the present disclosure, the first protruding arm 43' protrudes toward the receiving sub-groove 4' to form the first groove 43, and the second protruding arm 44' protrudes toward the receiving sub-groove 4' to form the second groove 44.

For example, design parameters of the spacer portion 4 may include: a thickness dp3 of the spacer portion 4, a width (i.e., size in the direction D2) wd4 of the receiving sub-groove 4', a depth (i.e., size in the direction D1) dp4 of the receiving sub-groove 4', a width (i.e., size in the direction D2) wd5 of the first groove 43 or the second groove 44, a depth (i.e., size in the direction D1) dp5 of the first groove 43 or the second groove 44, and the slope angle α of the inclined wall 45. In the embodiments of the present disclosure, at least some of the above-mentioned design parameters may be designed so that the spacer portion 4 may cooperate with the prism portion 5 to achieve a good optical effect and the seam may be eliminated.

For example, the width wd4 of the receiving sub-groove 4' and the width wd5 of the first groove 43 or the second groove 44 are both related to the width of the prism portion 5. The width wd5 of the first groove 43 or the second groove 44 is proportional to the width of the embedding portion of the prism portion 5, and the width wd5 may be set to 3~10 mm. The width wd4 of the receiving sub-groove 4' is proportional to the width of the middle portion of the prism portion 5, and the width wd4 may be set to 4~51 mm.

Design values of the depth dp4 of the receiving sub-groove 4' and the depth dp5 of the first groove 43 or the second groove 44 are related to a substrate thickness of the prism portion. In order to facilitate the insertion of the prism portion, the depth dp5 of the first groove 43 or the second groove 44 needs to be 0.05~0.1 mm greater than an edge substrate thickness of the prism portion 5, and the depth dp5 may be set to 0.1~0.9 mm. In the embodiments of the present disclosure, the first vertex of the prism does not exceed a surface of the spacer portion 4 away from the display panel (i.e., upper surface of the spacer portion 4) in the light emitting direction D1. For example, the surface of the spacer portion 4 away from the display panel may exceed the first vertex of the prism by 0.05~0.1 mm, such as 0.15~1.05 mm in the light emitting direction D1. Through such design, the prisms in the prism portion may be prevented from being scratched.

Figure 13A:
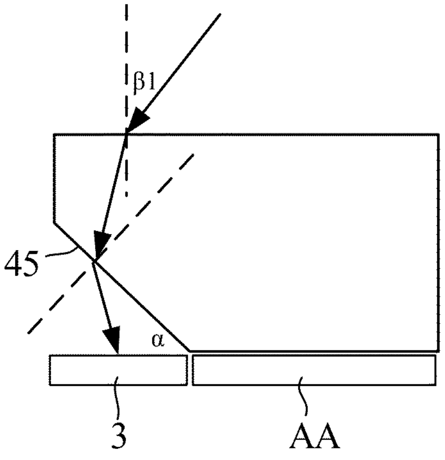
FIG. 13A to FIG. 13C are schematic optical path diagrams of a spliced display panel when a slope angle of an inclined wall or a surface of the inclined wall is in different reflection states according to the embodiments of the present disclosure, respectively.
Figure 13B:
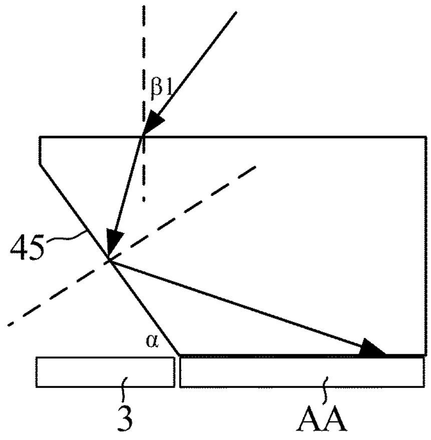
Figure 13C:
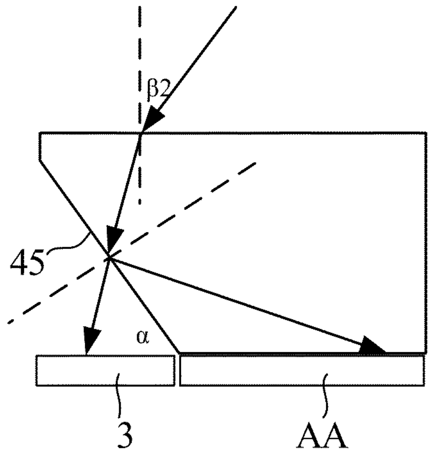

FIG. 13A to FIG. 13C are schematic optical path diagrams of the spliced display panel when the slope angle of the inclined wall or the surface of the inclined wall is in different reflection states according to the embodiments of the present disclosure, respectively.

In the embodiments of the present disclosure, the slope angle α of the inclined wall 45 may affect the display effect at the seam under an oblique viewing angle. The greater the slope angle α is, the better the seam elimination effect is under the oblique viewing angle. For example, in the embodiments of the present disclosure, the slope angle α of the inclined wall 45 needs to be set as large as possible, for example, the slope angle α>45°.

In the embodiments of the present disclosure, the surface of the inclined wall 45 is configured to totally reflect the light emitted from the display panel and incident onto the surface of the inclined wall 45. For example, the surface of the inclined wall is a polished surface and/or is provided with a total reflection coating. For example, the surface of the inclined wall may be made by polishing a reflection surface and then spraying a total reflection paint. For another example, a specular reflection flat surface may be added outside the reflection surface and then bonded to the reflection surface (refer to descriptions of the fixing bracket below) to form the surface of the inclined wall. For yet another example, it is possible to polish the surface of the inclined wall 45 and provide a large slope angle α, so that the incident light incident onto the surface of the inclined wall 45 may be reflected, thereby improving the seam elimination effect under the oblique viewing angle.

In the embodiments shown in FIG. 13A, the slope angle α of the inclined wall 45 is 45°. In the embodiments shown in FIG. 13B, the slope angle α of the inclined wall 45 is 60°. In the embodiments shown in FIG. 13C, the slope angle α of the inclined wall 45 is 60°, and the surface of the inclined wall 45 is configured as a total reflection surface.

As shown in FIG. 13A and FIG. 13B, in a case of a same incident angle θ1, when the slope angle α of the inclined wall 45 is 45°, the incident light is refracted to a region where the seam 3 is located after passing through the surface of the inclined wall 45, and when the slope angle α of the inclined wall 45 is 60°, the incident light is reflected to the display region AA after passing through the surface of the inclined wall 45. That is, the greater the slope angle α of the inclined wall 45 is, the easier it is for the light to be reflected on the surface of the inclined wall 45 and enter the display region AA. According to a principle of optical path reversibility, when the slope angle α of the inclined wall 45 is 45°, there is no light under the surface of the inclined wall 45 that may be reflected by the surface of the inclined wall 45 and finally enter human eyes through the optical assembly; and when the slope angle α of the inclined wall 45 is 60°, the light emitted from the display region AA may be reflected on the surface of the inclined wall 45 and then refracted to human eyes through the optical assembly.

As shown in FIG. 13C, when the slope angle α of the inclined wall 45 is 60°, in a case of a large incident angle β2, after the light is incident onto the surface of the inclined wall 45, the light may enter the region where the seam 3 is located (the light shown by the dotted line in FIG. 13C enters the region where the seam 3 is located) if the surface of the inclined wall 45 is a common reflection surface. According to the principle of optical path reversibility, the seam is still visible under a large oblique viewing angle. When the slope angle $\alpha$ of the inclined wall 45 is 60° and the surface of the inclined wall 45 is configured as the total reflection surface, in a case of a large incident angle $\beta 2$, after the light is incident onto the surface of the inclined wall 45, the light may be reflected on the surface of the inclined wall 45 and enters the display region AA. According to the principle of optical path reversibility, the seam is invisible under a large oblique viewing angle.

In the embodiments of the present disclosure, the thickness dp3 of the spacer portion 4 may range from 5 mm to 15 mm. The thickness of the spacer portion may affect the optical effect of the prism portion. The greater the thickness of the spacer portion, the better the effect of covering the seam. However, the greater the thickness, the greater a weight of the entire module, which may cause a problem of installation safety. In the embodiments of the present disclosure, the thickness of the spacer portion is set to 5~15 mm in comprehensive consideration of the picture display effect and the module weight.

Figure 14A:
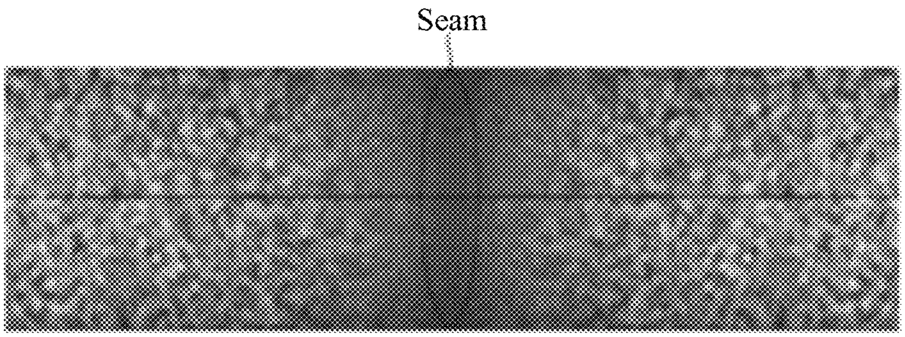
FIG. 14A to FIG. 14C are simulation effect diagrams of a spliced display panel with different spacer portion thicknesses according to the embodiments of the present disclosure, respectively.
Figure 14B:
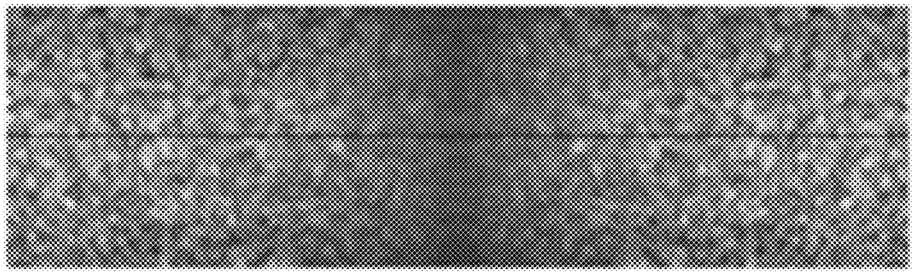
Figure 14C:
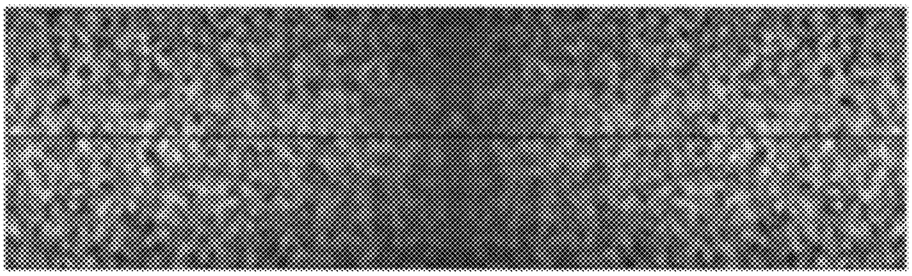

FIG. 14A to FIG. 14C are simulation effect diagrams of the spliced display panel with different spacer portion thicknesses according to the embodiments of the present disclosure, respectively.

For example, in the simulation software, the parameters may be set as follows: the seam is 4 mm, the focal length of the prism portion is 40 mm, the minimum tooth pitch between prisms is 0.1 mm, and the tooth depth of the prism is 0.1 mm. Under such conditions, spacer portion models with different thicknesses may be provided to perform a comparative analysis of simulation effects. In FIG. 14A, the thickness of the spacer portion is 10 mm; in FIG. 14B, the thickness of the spacer portion is 12 mm; and in FIG. 14C, the thickness of the spacer portion is 15 mm.

As shown in FIG. 14A to FIG. 14C, with an increase of the thickness of the spacer portion, the picture display effect at the seam position gradually becomes better, and the brightness transition gradually becomes uniform. Those skilled in the art should understand that the module weight may increase as the thickness of the spacer increases. The thickness of the spacer portion may be set to 5~15 mm in comprehensive consideration of the display effect at the seam and the module weight. For example, when a plastic material is used, the thickness of the spacer portion may be 5~15 mm; and when a glass material is used, the thickness of the spacer portion may be 5~10 mm.

Figure 6:
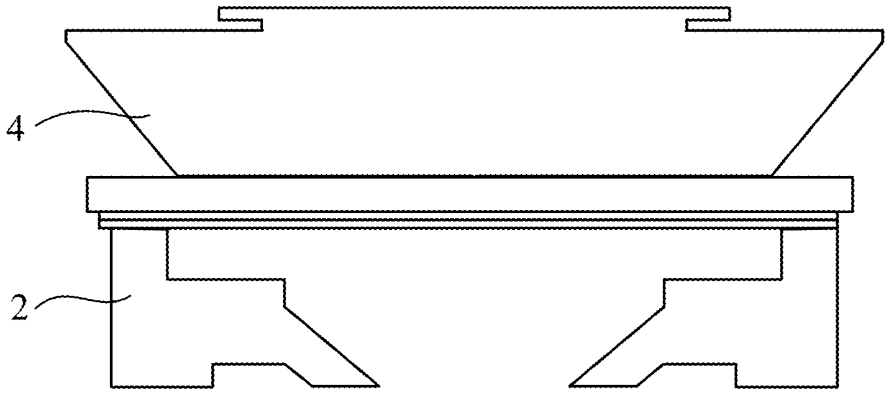
FIG. 6 and FIG. 7 schematically show different assembling modes of a spacer portion and a display panel in a spliced display panel according to the embodiments of the present disclosure. respectively.
Figure 7:
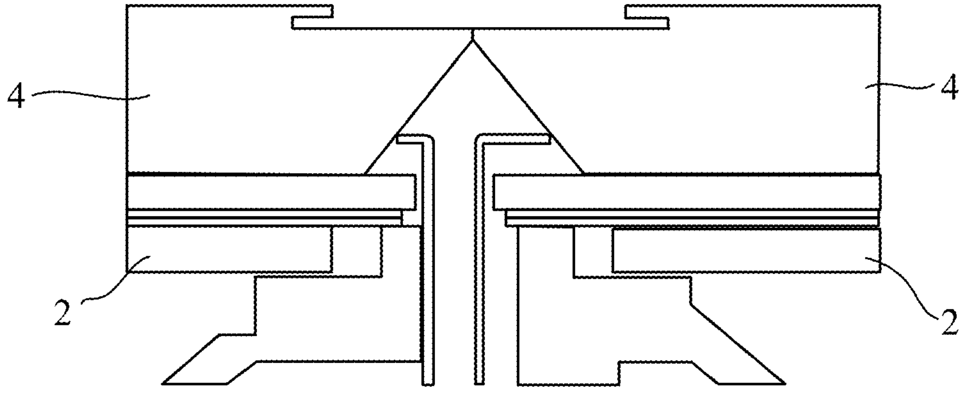

FIG. 6 and FIG. 7 schematically show different assembling modes of the spacer portion and the display panel in the spliced display panel according to the embodiments of the present disclosure.

In the embodiments shown in FIG. 6, the spacer portion is firstly assembled with a single display module (i.e., a single display panel) to form an optical module with the spacer portion of the optical assembly. Then, optical modules are spliced into an N*N module. Then, the prism portion of the optical assembly is inserted into the accommodating groove formed by adjacent spacer portions. In such embodiments, production and installation methods are simple and convenient, which is suitable for mass production.

In the embodiments shown in FIG. 7, a plurality of display modules (that is, a plurality of display panels) are assembled firstly. Then, the spacer portion of the optical assembly is installed on the spliced display panels. Then, the prism portion of the optical assembly is inserted into the accommodating groove formed by adjacent spacer portions. In such embodiments, the optical assembly is assembled after splicing the display modules, which may ensure an assembly accuracy and improve the seam elimination effect.

Figure 8A:
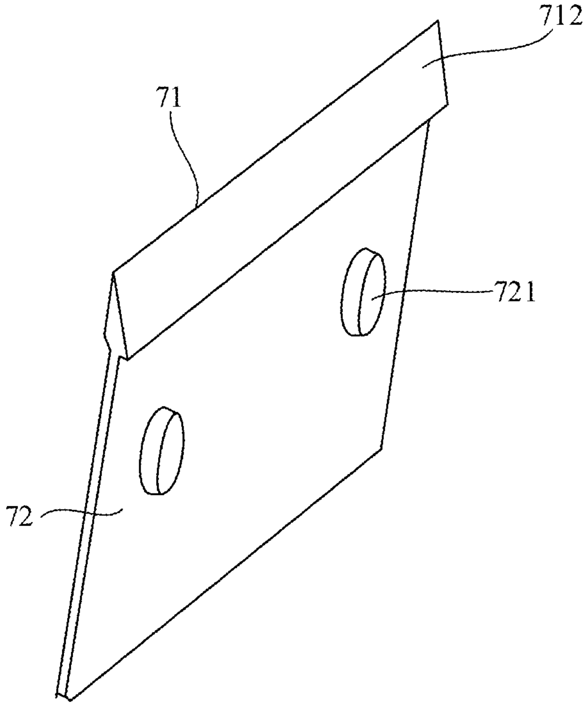
FIG. 8A is a schematic structural diagram of a fixing bracket of a spliced display panel according to the embodiments of the present disclosure.
Figure 8B:
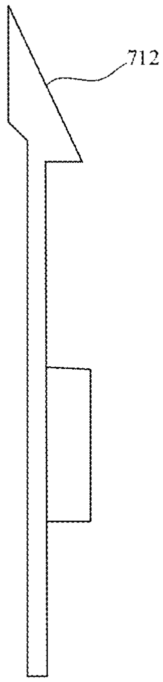
FIG. 8B is a front view of a fixing bracket of a spliced display panel according to the embodiments of the present disclosure.
Figure 9:
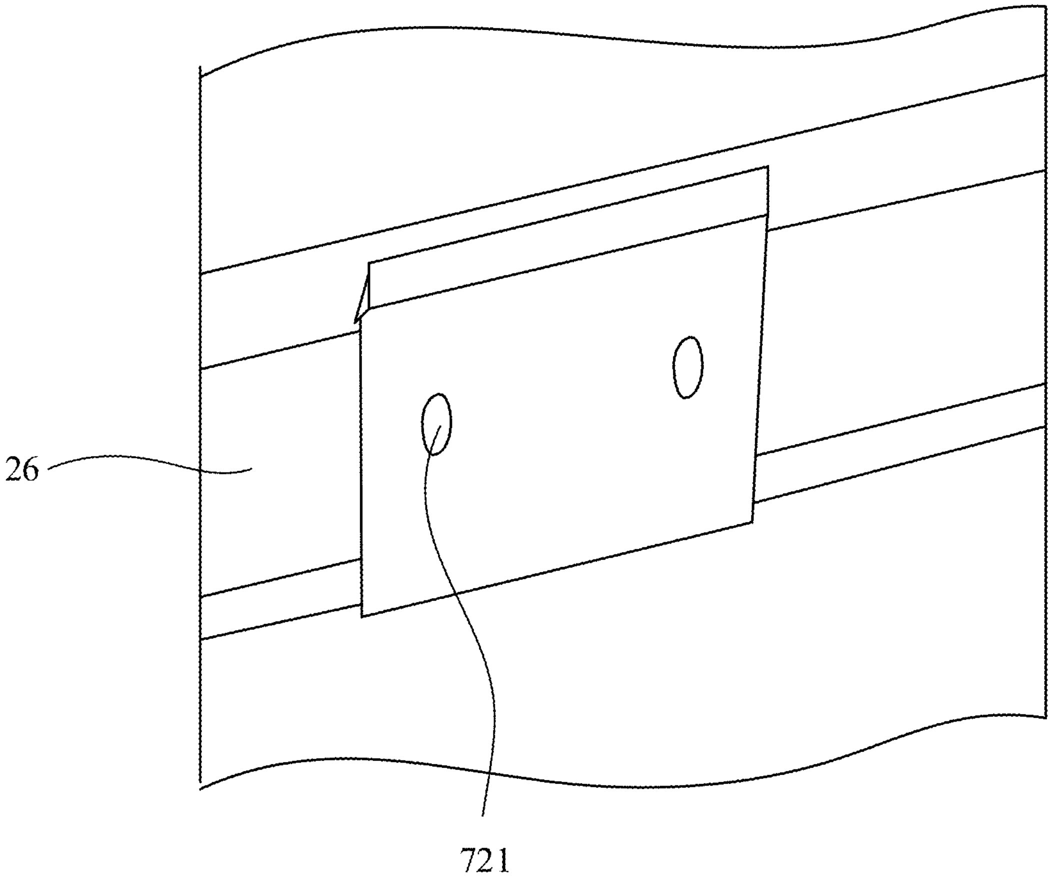
FIG. 9 schematically shows a schematic diagram of an installation structure of a fixing bracket and a display panel in a spliced display panel according to the embodiments of the present disclosure.

FIG. 8A is a schematic structural diagram of a fixing bracket of the spliced display panel according to the embodiments of the present disclosure. FIG. 8B is a front view of the fixing bracket of the spliced display panel according to the embodiments of the present disclosure. FIG. 9 schematically shows a schematic diagram of an installation structure of the fixing bracket and the display panel in the spliced display panel according to the embodiments of the present disclosure.

Referring to FIG. 2, FIG. 8A, FIG. 8B and FIG. 9, the first fixing portion 71 of the fixing bracket 7 includes a slope surface 712. A slope of the slope surface 712 is equal to the slope of the inclined wall 45, and the slope surface 712 is bonded to the inclined wall 45.

For example, the fixing bracket 7 includes a first bracket 7A and a second bracket 7B. The first bracket 7A is connected to one of two adjacent spliced display panels, and the second bracket 7B is connected to the other of the two.

Each of the first bracket 7A and the second bracket 7B includes a first fixing portion 71, and the first fixing portion 71 of each of the first bracket 7A and the second bracket 7B includes a slope surface 712. A combination of the first fixing portion of the first bracket and the first fixing portion of the second bracket has a substantially triangular cross-section.

Each of the first bracket 7A and the second bracket 7B includes a second fixing portion 72, and the second fixing portion 72 of each of the first bracket 7A and the second bracket 7B includes a threaded hole 721.

The display panel includes a front frame 26. The second fixing portion 72 of each of the first bracket 7A and the second fixing portion 72 of the second bracket 7B is connected to the front frame 26 of the display panel by a screw 722 inserted into the threaded hole 721.

For example, a material of the fixing bracket 7 may include a metal material, such as an electro-galvanized steel plate, a hot-dip galvanized steel plate, an aluminum plate and the like. A thickness of the fixing bracket 7 may be 0.3~0.6 mm, and a length of the fixing bracket 7 may be 30~100 mm.

In the embodiments of the present disclosure, a top end of the fixing bracket 7 is designed as a slope surface, which is kept parallel to the inclined wall at a bottom of the spacer portion. For example, an optical adhesive (i.e., OCA) may be applied on the slope surface of the fixing bracket 7, and a thickness of the optical adhesive may be 0.1~0.5 mm. In this way, the spacer portion may be tightly attached and fixed to the fixing bracket.

In the embodiments of the present disclosure, the slope surface of the fixing bracket 7 may be polished to a polished surface or a mirror surface, so that the slope surface of the fixing bracket 7 may serve as a total reflection surface. In this way, the seam elimination effect under an oblique viewing angle may be improved.

In the embodiments of the present disclosure, the spacer portion and the prism portion may be formed as separate structures, and the spacer portion and the prism portion may be conveniently assembled to form the optical assembly through the above-mentioned embedding portions and the above-mentioned grooves.

Optionally, in the embodiments of the present disclosure, the spacer portion and the prism portion may be an integral structure, that is, the spacer portion and the prism portion may be integrally made of the same material.

Figure 15A:
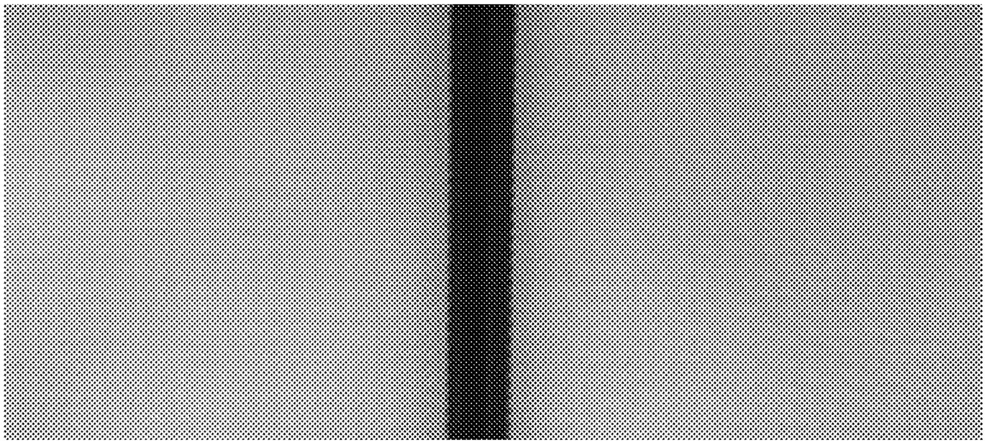
FIG. 15A and FIG. 15B are display effect diagrams of a seam of a spliced display panel in the related art when viewed from the front and viewed obliquely, respectively.
Figure 15B:
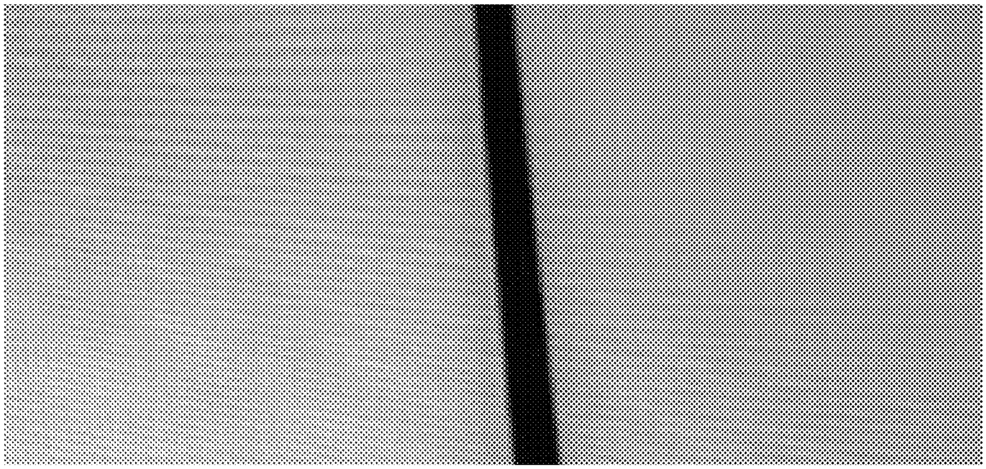
Figure 16A:
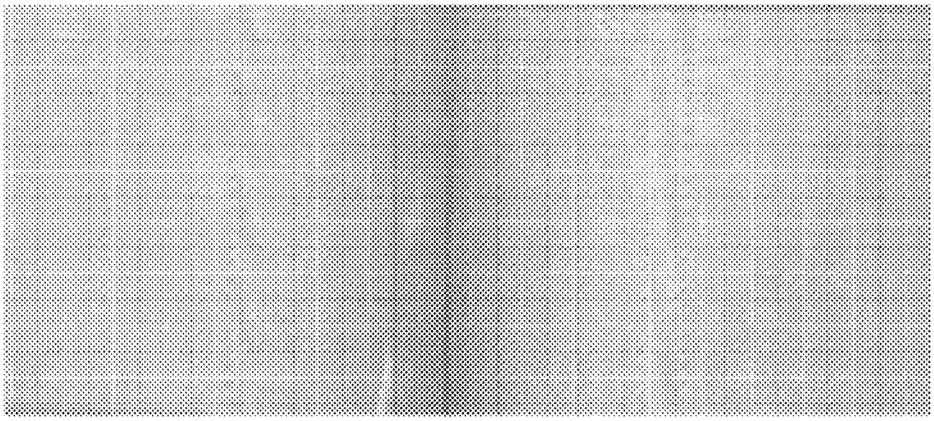
FIG. 16A and FIG. 16B are display effect diagrams of a seam of a spliced display panel according to the embodiments of the present disclosure when viewed from the front and viewed obliquely, respectively.
Figure 16B:
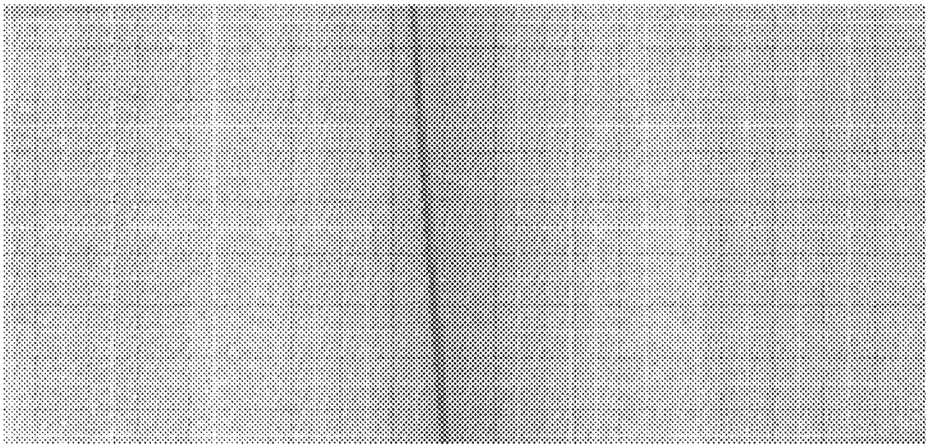

FIG. 15A and FIG. 15B are display effect diagrams of the seam of the spliced display panel in the related art when viewed from the front and viewed obliquely, respectively. FIG. 16A and FIG. 16B are display effect diagrams of the seam of the spliced display panel according to the embodiments of the present disclosure when viewed from the front and viewed obliquely, respectively.

In the embodiments of the present disclosure, the optical assembly is made of a transparent material. According to a principle of light refraction, the light emitted from the edge display region may be refracted to the region where the seam is located, so that the entire picture may be completely displayed, and the seam may be eliminated. As shown in FIG. 15A and FIG. 16A, when viewed from the front, due to the arrangement of the optical assembly, the black line at the seam is greatly weakened or substantially eliminated, and a complete display of the entire picture is achieved. As shown in FIG. 15B and FIG. 16B, when viewed obliquely, due to the arrangement of the optical assembly, the black line at the seam is greatly weakened or substantially eliminated, and a complete display of the entire picture is achieved.

In the embodiments of the present disclosure, the optical assembly includes the prism portion and the spacer portion, and the prism portion is substantially flush with the upper surface of the spacer portion, so that the entire optical assembly is integrated to prevent the prism from being scratched. In the embodiments of the present disclosure, it is possible to achieve a visually seamless splicing effect, and different display modules may be compatible by an adjustment of the parameters of the prism portion and the spacer portion without changing the structural design of the display modules, so that mold development costs may be saved.

In the above-mentioned embodiments, each prism may be in a shape of a straight sawtooth. However, the embodiments of the present disclosure are not limited thereto, and at least one prism may be in a shape of an arc-shaped tooth.

In the above-mentioned embodiments, the prism portion is provided in the spacer portion by being embedded in the accommodating groove. It should be understood that the embodiments of the present disclosure are not limited thereto, and the prism portion may be provided in or on the spacer portion in other ways. For example, the surface of the spacer portion away from the display panel may be a flat surface, and the prism portion may be provided on the flat surface. For another example, the spacer portion may include a recessed portion on the side of the spacer portion away from the display panel, and the prism portion is provided in the recessed portion. In such embodiment, the recessed portion is a portion of the spacer portion recessed downwardly (i.e., in a direction toward the display panel), which may have no embedding groove for embedding. When the prism portion is provided in the recessed portion, the first vertex of the prism does not exceed the surface of the spacer portion away from the display panel in the light emitting direction. For example, in the light emitting direction, the first vertex of the prism may be at a same height as the surface of the spacer portion away from the display panel.

The embodiments of the present disclosure further provide a spliced display device. The spliced display device may include the spliced display panel according to the above-mentioned embodiments. Since the spliced display device provided by the embodiments of the present disclosure includes the above-mentioned spliced display panel, the same beneficial effect may be achieved, and the details will not be repeated here.

Although some embodiments according to the general concept of the present disclosure have been illustrated and described, it should be understood by those ordinary skilled in the art that changes may be made to those embodiments without departing from the principle and spirit of the general inventive concept of the present disclosure. The scope of the present disclosure is defined by the claims and their equivalents.

What is claimed is:

1. A spliced display panel, comprising:
- a plurality of display panels, adjacent display panels in the plurality of display panels being spliced;
- a seam between at least two of the adjacent display panels that are spliced; and
- an optical assembly located on a light emitting side of the plurality of display panels, an orthographic projection of the optical assembly on the plurality of display panels covering an orthographic projection of the seam on the plurality of display panels,
- wherein the optical assembly comprises:
  - a spacer portion; and
  - a prism portion provided on the spacer portion, wherein the prism portion comprises a plurality of prisms, and an orthographic projection of at least one prism in the plurality of prisms on the plurality of display panels overlaps with the orthographic projection of the seam on the plurality of display panels;
  - wherein the spacer portion comprises an accommodating groove on a side of the spacer portion away from the plurality of display panels; and the prism portion is provided in the accommodating groove.

2. A spliced display panel, comprising:
- a plurality of display panels, adjacent display panels in the plurality of display panels being spliced;
- a seam between at least two of the adjacent spliced display panels that are spliced; and
- an optical assembly located on a light emitting side of the plurality of display panels, an orthographic projection of the optical assembly on the plurality of display panels covering an orthographic projection of the seam on the plurality of display panels,
- wherein the optical assembly comprises:
  - a spacer portion; and
  - a prism portion provided on the spacer portion, wherein the prism portion comprises a plurality of prisms, and an orthographic projection of at least one prism in the plurality of prisms on the plurality of display panels overlaps with the orthographic projection of the seam on the plurality of display panels;
  - wherein a surface of the spacer portion away from the plurality of display panels is a flat surface, and the prism portion is provided on the flat surface.

3. A spliced display panel, comprising:
- a plurality of display panels, adjacent display panels in the plurality of display panels being spliced;
- a seam between at least two of the adjacent spliced display panels that are spliced; and
- an optical assembly located on a light emitting side of the plurality of display panels, an orthographic projection of the optical assembly on the plurality of display panels covering an orthographic projection of the seam on the plurality of display panels,
- wherein the optical assembly comprises:
  - a spacer portion; and
  - a prism portion provided on the spacer portion, wherein the prism portion comprises a plurality of prisms, and an orthographic projection of at least one prism in the plurality of prisms on the plurality of display panels overlaps with the orthographic projection of the seam on the plurality of display panels;

wherein the spacer portion comprises a recessed portion on a side of the spacer portion away from the plurality of display panels; and wherein the prism portion is provided in the recessed portion.

4. The spliced display panel according to claim 1, wherein the spliced display panel further comprises a fixing bracket located in the seam, and the fixing bracket is configured to fixedly connect the optical assembly with the plurality of display panels;

the fixing bracket comprises a first fixing portion connected to the optical assembly and a second fixing portion connected to the plurality of display panels; and the spacer portion comprises an installation groove, and the first fixing portion is located in the installation groove.

5. The spliced display panel according to claim 1, wherein the prism portion comprises a body portion, the body portion comprises a first embedding portion, a middle portion and a second embedding portion, the first embedding portion and the second embedding portion are located on two opposite sides of the middle portion, and the plurality of prisms are arranged on a side of the middle portion away from the plurality of display panels; and the middle portion protrudes relative to the first embedding portion and the second embedding portion in a light emitting direction of the plurality of display panels.

6. The spliced display panel according to claim 5, wherein the spacer portion comprises a first groove and a second groove located on two opposite sides of the accommodating groove, the first embedding portion is embedded in the first groove, and the second embedding portion is embedded in the second groove.

7. The spliced display panel according to claim 5, wherein the prism portion has a symmetrical structure with respect to a first axis, the first axis is parallel to the light emitting direction of the plurality of display panels, and the first axis is located at a middle position of the seam in a width direction of the seam; and the plurality of prisms comprise a first group of prisms and a second group of prisms, and the first group of prisms and the second group of prisms are symmetrical with respect to the first axis.

8. The spliced display panel according to claim 7, wherein the plurality of prisms have a zigzag structure embedded in the middle portion, parameters of each of the plurality of prisms comprise a tooth depth and a tooth angle, each prism has a first vertex away from the spacer portion and a second vertex close to the spacer portion, the tooth depth is a size between the first vertex and the second vertex in the light emitting direction, and the tooth angle is a vertex angle of the prism at the first vertex; and each of the first group of prisms and the second group of prisms comprises a first prism closest to the first axis and a second prism farthest away from the first axis, and the tooth angles of the prisms gradually increase in a direction from the first prism to the second prism.

9. The spliced display panel according to claim 8, wherein the tooth depths of the plurality of prisms are equal to each other.

10. The spliced display panel according to claim 8, wherein a distance between two adjacent prisms in each of the first group of prisms and the second group of prisms is a tooth pitch; and the tooth pitches in each of the first group of prisms and the second group of prisms gradually increase in the direction from the first prism to the second prism.

11. The spliced display panel according to claim 10, wherein:

the tooth depths of the plurality of prisms gradually increase in the direction from the first prism to the second prism; and/or the tooth pitches in each of the first group of prisms and the second group of prisms remain unchanged in the direction from the first prism to the second prism.

12. The spliced display panel according to claim 4, wherein:

the spacer portion comprises an inclined wall on a side of the spacer portion close to the seam, and an orthographic projection of at least part of the inclined wall on the plurality of display panels overlaps with the orthographic projection of the seam on the plurality of display panels; and the inclined wall has a slope angle with respect to a light emitting surface of the display panel, and the slope angle is greater than or equal to 45°.

13. The spliced display panel according to claim 12, wherein:

a surface of the inclined wall is configured to totally reflect light emitted from the plurality of display panels and incident onto the surface of the inclined wall;

the first fixing portion of the fixing bracket comprises a slope surface, a slope of the slope surface is equal to a slope of the inclined wall, and the slope surface is bonded on the inclined wall; and the surface of the inclined wall is a polished surface and/or is provided with a total reflection coating; and/or the slope surface is a polished surface.

14. The spliced display panel according to claim 4, comprising a plurality of the spaced portions, wherein the inclined walls of two adjacent spacer portions are abutted against each other and are formed as groove walls of the installation groove; and wherein orthographic projections of abutting portions of the inclined walls of two adjacent spacer portions on the plurality of display panels fall within the orthographic projection of the seam on the plurality of display panels.

15. The spliced display panel according to claim 4, wherein:

the fixing bracket comprises a first bracket and a second bracket, the first bracket is connected to a first one of two adjacent display panels that are spliced, and the second the bracket is connected to a second one of the two adjacent display panels that are spliced;

each of the first bracket and the second bracket comprises a first fixing portion, the first fixing portion of each of the first bracket and the second bracket comprises a slope surface, and a combination of the first fixing portion of the first bracket and the first fixing portion of the second bracket has a substantially triangular cross-section;

each of the first bracket and the second bracket comprises a second fixing portion, and the second fixing portion of each of the first bracket and the second bracket comprises a threaded hole; and the display panel comprises a front frame, and the second fixing portion of each of the first bracket and the second bracket is connected to the front frame of the display panel through a screw inserted into the threaded ho.

16. The spliced display panel according to claim 8, wherein:

the first vertex of the prism does not exceed a surface of the spacer portion away from the plurality of display panels in the light emitting direction;

the surface of the spacer portion away from the plurality of display panels exceeds the first vertex of the prism by 0.05~0.1 mm in the light emitting direction; and a thickness of the spacer portion ranges from 5 mm to 15 mm.

17. The spliced display panel according to claim 10, wherein:

the tooth depth of each prism ranges from 0.05 mm to 0.5 mm; and/or the tooth pitch between any two adjacent prisms ranges from 0.05 mm to 1 mm; and/or the tooth angle of each prism ranges from 40° to 70°; and/or a focal length of the prism portion ranges from 10 mm to 50 mm.

18. The spliced display panel according to claim 1, wherein:

the spacer portion and the prism portion are formed as an integral structure; and a material of the spacer portion and/or the prism portion comprises polymethyl methacrylate, polycarbonate, polyethylene terephthalate or glass, and/or a material of the fixing bracket comprises a metal.

19. A display device, comprising the spliced display panel according to claim 1.

* * * * *